(12) United States Patent
Macedo et al.

(10) Patent No.: US 12,320,770 B2
(45) Date of Patent: Jun. 3, 2025

(54) INTERFERENCE RESISTANT SOLID STATE REFERENCE ELECTRODE (71) Applicant: COMMONWEALTH SCIENTIFIC AND INDUSTRIAL RESEARCH ORGANISATION, Australian Capital Territory (AU)

(72) Inventors: David Simon Macedo, Blackburn South (AU); Mikko Kalevi Vepsäläinen, Chadstone (AU)

(73) Assignee: COMMONWEALTH SCIENTIFIC AND INDUSTRIAL RESEARCH ORGANISATION, Australian Capital Territory (AU)

( * ) Notice: Subject to any disclaimer, the term of this patent is extended or adjusted under 35 U.S.C. 154(b) by 475 days.

(21) Appl. No.: 17/773,367

(22) PCT Filed: Nov. 6, 2020

(86) PCT No.: PCT/AU2020/051213
§ 371 (c)(1),
(2) Date: Apr. 29, 2022

(87) PCT Pub. No.: WO2021/087572
PCT Pub. Date: May 14, 2021

(65) Prior Publication Data
US 2022/0397544 A1    Dec. 15, 2022

(30) Foreign Application Priority Data

Nov. 8, 2019    (AU) .................................. 2019904216

(51) Int. Cl.
*G01N 27/30* (2006.01)
*G01N 27/32* (2006.01)
*G01N 27/333* (2006.01)

(52) U.S. Cl.
CPC ........... *G01N 27/301* (2013.01); *G01N 27/32* (2013.01); *G01N 27/333* (2013.01)

(58) Field of Classification Search
CPC ..... G01N 27/301; G01N 27/32; G01N 27/333
See application file for complete search history.

(56) References Cited

U.S. PATENT DOCUMENTS 5,271,820 A     12/1993  Kinlen et al.
11,378,541 B1 *  7/2022  Dong .................. G01N 27/3335
(Continued)

FOREIGN PATENT DOCUMENTS

EP      1193495 A2    4/2002
JP      S59190650 A   4/1983
(Continued)

OTHER PUBLICATIONS

Vonau et al., An all-solid-state reference electrode, Sensors and Actuators B: Chemical, 2010, 144, 368-373 (Year: 2010).*

(Continued)

*Primary Examiner* — Luan V Van
*Assistant Examiner* — Shizhi Qian
(74) *Attorney, Agent, or Firm* — LADAS & PARRY LLP (57) ABSTRACT

The invention provides a solid state reference electrode comprising: a reference element in ionic communication with a composite, the composite comprising a water-permeable polymeric matrix loaded with a solid inorganic salt comprising a reference anion; an electrode surface for contacting an analyte; and a solid ion-exchange material located between the electrode surface and the reference element, the solid ion-exchange material comprising one or more non-interfering ions, wherein in use the solid ionexchange material immobilises one or more interfering ions, when present in solution in the analyte, by exchange with the noninterfering ions.

19 Claims, 3 Drawing Sheets

(56) References Cited

U.S. PATENT DOCUMENTS

2002/0065332 A1* 5/2002 Choi .................. G01N 27/301
521/82
2010/0204407 A1* 8/2010 Bouquet ................ C08F 4/56
526/89
2015/0323485 A1* 11/2015 Sokalski .............. G01N 27/301
264/494

FOREIGN PATENT DOCUMENTS

| JP | 2003262606 A | 9/2003 |
|---|---|---|
| WO | 9635116 A1 | 11/1996 |
| WO | 2018/201200 A1 | 11/2018 |

OTHER PUBLICATIONS

Liebman, Paradigms and paradoxes: the solubility of AgCl in water: some thermochemical issues of aqueous Ag+ion, Structural chemistry, 2004, 15(2), 165-168 (Year: 2004).*
Mangold et al., Reference electrodes based on conducting polymers, Fresenius J. Anal. Chem., 2000, 367, 340-342 (Year: 2000).*
Kieiel et al., Polypyrrole microcapsules in all-solid-state reference electrodes, Electroanalysis, 2012, 24, 165-172 (Year: 2012).*
Tymecki et al., Screen-printed reference electrodes for potentiometric measurements, Analytica Chimica Acta, 2004, 526, 3-11 (Year: 2004).*
Wu et al., Fabrication of a PVC-based solid-state Ag/AgCl reference electrode, 2019 IEEE Int. Symp. on Olfaction and Electronic Nose, 10.1109/ISOEN.2019.8823326, 2019. (Year: 2019).*
ISR for International Application PCT/AU2020/051213 mailed Nov. 30, 2020.
Written Opinion for International Application PCT/AU2020/051213 mailed Nov. 30, 2020.
Klaus-Michael Mangold, et al., 'Reference electrodes based on conducting polymers', Fresenius J Anal Chem, 2000, vol. 367, pp. 340-342.
Anna Kisiel, et al., 'Polypyrrole Microcapsules in All-solid-state Reference Electrodes', Electroanalysis, 2012, vol. 24, No. I, pp. 165-172, Abstract; p. 166: sections 2.1, 2.3 and 2.5, p. 167: scheme 1 and left column.
Examination Report dated May 7, 2024 issued by the Japanese Patent Office on corresponding patent application 2022-526134.

* cited by examiner

Figure 6

INTERFERENCE RESISTANT SOLID STATE REFERENCE ELECTRODE

RELATED APPLICATION

This application is an application under 35 U.S.C. 371 of International Application No. PCT/AU2020/051213 filed 6 Nov. 2020, which claims priority from Australian application Ser. No. 20/199,04216 filed 8 Nov. 2019, the disclosures of which are incorporated in their entirety by reference herein.

TECHNICAL FIELD

The invention relates to a solid state reference electrode. In particular, the electrode comprises a reference element in ionic communication with a polymeric composite loaded with inorganic salt comprising reference anion, and a solid ion-exchange material located between the electrode surface and the reference element. In use, the solid ion-exchange material immobilises interfering ions present in the analyte by exchange with non-interfering ions present in the material. The invention also relates to a system for electrochemical analysis of an analyte comprising the solid state reference electrode, and to a method of electrochemical analysis of an analyte using the solid state reference electrode.

BACKGROUND OF INVENTION

Electroanalytical techniques, including potentiometric and voltametric electroanalytical measurements, rely on both an indicator (sensing) electrode and a reference electrode, the performance of which are of equal importance for the accuracy of the measurement. It is thus critical that the reference electrode provides a stable and reproducible potential which is substantially independent of the concentration of species in the analyte, including the target species for analysis.

To provide a constant reference potential, reference electrodes have traditionally included a reference element immersed in a reservoir of liquid or gel electrolyte of known salt concentration, contained within a casing. Silver/silver chloride (Ag/AgCl) and calomel (Hg/Hg$_2$Cl$_2$) reference elements in aqueous potassium chloride (KCl) electrolytes are common. Although the electrolyte is substantially isolated from the analyte by the casing, a liquid junction (salt bridge) between the analyte and the internal electrolyte is required to provide ionic communication, thereby completing the electrochemical cell. The liquid junction typically comprises a small opening or porous plug in the casing.

Although traditional reference electrodes are suitable for many applications, they also have significant disadvantages. These include leakage of the electrolyte through the liquid junction, potentially contaminating the analyte with the reference electrolyte salt, and infiltration of the analyte into the internal electrolyte, affecting the electrolyte salt concentration and introducing extraneous species that interfere with the reference half-cell reaction. Although the junction and electrolyte can be designed to mitigate these concerns, there is an inherent trade-off between the imperatives to minimise liquid communication between electrolyte and analyte and to maintain an acceptable junction potential, which is a source of error in the analytical measurement. Furthermore, traditional electrodes are difficult to miniaturise due to the electrolyte volume and complex construction, and are also generally positionally dependent, fragile, expense and maintenance-intensive.

A number of previous efforts have been made to address one or more of these challenges using solid state reference electrodes which lack an internal liquid electrolyte reservoir and corresponding liquid-liquid junction. Vonau et al., DE 10305005, described a sintered Ag/AgCl reference element embedded in a solidified melt of KCl. The KCl was enclosed within a ceramic layer and an outer casing, with the ceramic exposed at a small opening in the casing forming a junction to modulate ionic communication and limit KCl dissolution into the analyte. These electrodes remain reliant on a porous junction between the interior salt and the analyte, resulting in a fragile and complex construction.

One promising approach has been to embed the reference element in a composite in the form of a water-permeable polymeric matrix loaded with an inorganic salt comprising reference anion. When immersed in an aqueous analyte, the composite is hydrated until a saturation concentration of the reference anion is provided at the reference element. Thus, for example, Vonau et al., DE19533059, reported reference electrodes comprising an Ag/AgCl reference element embedded in a polyester resin composite loaded with KCl. Mousavi et al., Analyst 2013 (138) 5216 and Journal of Solid State Electrochemistry 2014 (18) 607, prepared reference electrodes comprising an Ag/AgCl reference element embedded in a polyvinyl acetate (PVAc) homopolymer loaded with particulate KCl. If suitably designed, the polymer matrix prevents rapid leaching of the salt while still allowing sufficient ionic conductivity between the reference element and analyte.

In many applications, however, the analyte of interest contains components which degrade the composite or otherwise interfere with the long-term stability of the measured reference potential. For example, highly acidic or abrasive analytes may degrade polymeric composite electrodes to the point that dimensional stability is lost and the inorganic salt leaches out. In the applicant's co-pending PCT application published as WO2018/201200, this was addressed by using a composite having a cross-linked vinyl polymer matrix.

However, solid state reference electrodes comprising a polymeric composite loaded with reference salt remain susceptible to interference by soluble ionic species capable of participating in competitive redox reactions at the reference element. These undesirable reactions result in a drift away from the expected electrode potential. In particular, anionic species such as sulphide, bromide, iodide and cyanide may interfere with reference electrodes which rely on chloride or sulphate as the reference anion.

There is therefore an ongoing need to provide solid state reference electrodes which at least partially address one or more of the above-mentioned short-comings or provide a useful alternative.

A reference herein to a patent document or other matter which is given as prior art is not to be taken as an admission that the document or matter was known or that the information it contains was part of the common general knowledge as at the priority date of any of the claims.

SUMMARY OF INVENTION

The inventors have found that a polymer composite reference electrode with increased resistance to redox interference by ionic species present in the analyte may be obtained by incorporating a solid ion-exchange material having exchangeable non-interfering ions. In use, the solid ion-exchange material intercepts one or more interfering ions diffusing into the electrode from the analyte, thereby reducing the probability of undesirable redox reactions at the reference element. The ion-exchange reaction immobilises the interfering ions and releases non-interfering ions which have no substantial effect on the measured reference potential.

In accordance with a first aspect the invention provides a solid state reference electrode comprising: a reference element in ionic communication with a composite, the composite comprising a water-permeable polymeric matrix loaded with a solid inorganic salt comprising a reference anion; an electrode surface for contacting an analyte; and a solid ion-exchange material located between the electrode surface and the reference element, the solid ion-exchange material comprising one or more non-interfering ions, wherein in use the solid ion-exchange material immobilises one or more interfering ions, when present in solution in the analyte, by exchange with the non-interfering ions.

In some embodiments, the solid ion-exchange material comprises a metal salt or an ion exchange resin. In some embodiments, the solid ion-exchange material comprises a metal salt having lower water solubility than the solid inorganic salt.

In some embodiments, the one or more non-interfering ions are non-interfering anions and the one or more interfering ions are interfering anions. The non-interfering anions may comprise the reference anion. In some embodiments, the solid ion-exchange material comprises a metal salt comprising cations selected from the group consisting of silver, mercury and lead. In some embodiments, the solid ion-exchange material comprises a metal salt comprising a metal present in the reference element. In some embodiments, the interfering anions are selected from the group consisting of sulphide, iodide, bromide and cyanide. In some embodiments, the interfering anions comprise sulphide.

In some embodiments, the solid ion-exchange material is a particulate material.

In some embodiments, the solid ion-exchange material is loaded in the polymeric matrix of the composite or is loaded in a further polymeric composite located between the electrode surface and the reference element. The further polymeric composite may comprise the solid anion-exchange material dispersed in a hydratable polymer.

In some embodiments, the solid ion-exchange material is loaded in the polymeric matrix of the composite. The solid ion-exchange material may be present in an amount of at least 1 wt %, such as at least 3 wt %, of the composite.

In some embodiments, the solid ion-exchange material is loaded in a water-permeable layer of the further polymeric composite located between the electrode surface and the composite.

In some embodiments, the reference anion is chloride. In some embodiments, the reference element is selected from the group consisting of Ag/AgCl and calomel.

In some embodiments, the water-permeable polymeric matrix comprises a vinyl polymer of a vinyl monomer containing a heteroatom. The vinyl polymer may be cross-linked. The cross-linked vinyl polymer may be a co-polymer of i) at least one vinyl monomer selected from the group consisting of vinyl esters, vinyl amides and acrylates and ii) a cross-linking agent comprising at least two co-polymerisable vinyl functionalities. The hydratable polymer, if present, may similarly be a vinyl polymer of a vinyl monomer containing a heteroatom.

In some embodiments, the composite comprises at least 30% by mass of the solid inorganic salt.

In accordance with a second aspect the invention provides a system for electrochemical analysis of an analyte, the system comprising: a solid state reference electrode according to any embodiment of the first aspect; a second electrode selected from an ion-selective electrode and a working electrode; and means for measuring the difference in electric potential between the second electrode and the reference electrode.

In accordance with a third aspect the invention provides a method of electrochemical analysis of an analyte, the method comprising: contacting i) a solid state reference electrode according to any embodiment of the first aspect and ii) a second electrode selected from an ion-selective electrode and a working electrode with an analyte; and measuring the difference in electrochemical potential between the second electrode and the reference electrode.

In some embodiments, the analyte comprises one or more interfering ions in solution. In some such embodiments, the interfering ions are interfering anions. The interfering anions may be selected from the group consisting of sulphide, iodide, bromide and cyanide. In some embodiments the interfering anions comprise sulphide.

Where the terms "comprise", "comprises" and "comprising" are used in the specification (including the claims) they are to be interpreted as specifying the stated features, integers, steps or components, but not precluding the presence of one or more other features, integers, steps or components, or group thereof.

As used herein, the terms "first", "second", "third" etc in relation to various features of the disclosed devices are arbitrarily assigned and are merely intended to differentiate between two or more such features that the device may incorporate in various embodiments. The terms do not of themselves indicate any particular orientation or sequence. Moreover, it is to be understood that the presence of a "first" feature does not imply that a "second" feature is present, the presence of a "second" feature does not imply that a "first" feature is present, etc.

Further aspects of the invention appear below in the detailed description of the invention.

BRIEF DESCRIPTION OF DRAWINGS

Embodiments of the invention will herein be illustrated by way of example only with reference to the accompanying drawings in which.

DETAILED DESCRIPTION

Solid State Reference Electrode

The present invention relates to a solid state reference electrode. The electrode comprises a reference element in ionic communication with a composite. The composite comprises a water-permeable polymeric matrix loaded with a solid inorganic salt comprising a reference anion. The electrode has an electrode surface for contacting an analyte, and a solid ion-exchange material is located between the electrode surface and the reference element. The solid ion-exchange material comprises one or more non-interfering ions. In use, the solid ion-exchange material immobilises one or more interfering ions, when present in solution in the analyte, by exchange with the non-interfering ions.

Reference Element

The solid state reference electrode includes a reference element. As used herein, a reference element is an electrically conductive body which includes, or develops in situ, a redox couple capable of providing a reference potential when exposed to a reference electrolyte in use.

The reference element may be any suitable reference element capable of providing a stable potential when in contact with a reference electrolyte having a constant concentration of a reference anion. Such reference elements include those with silver-silver chloride (Ag/AgCl), calomel ($Hg/Hg_2Cl_2$), silver-silver sulfate ($Ag/Ag_2SO_4$), and mercury-mercury sulfate ($Hg/Hg_2SO_4$) redox couples. In some embodiments, the reference element is an Ag/AgCl or calomel reference element, which provide a reference potential when exposed to a reference electrolyte comprising a stable chloride concentration. Ag/AgCl reference elements are particularly preferred at least in part for environmental and safety reasons.

The Ag/AgCl reference element may comprise a silver wire or other silver metallic body which is coated with silver chloride, typically electrochemically or by chemical oxidation. In some embodiments, the reference element comprises a meshed or braided metallic structure to improve the surface area in contact with the composite. Ag/AgCl reference elements may also be fabricated by a variety of other methods, including by sintering a mixture of Ag and AgCl powders. Printed Ag/AgCl reference elements may be obtained by printing a layer of silver onto a substrate, then chemically oxidising the layer using a chlorinating agent such as hypochlorite. Alternatively, an ink comprising both Ag and AgCl particles in a carrier may be used.

In use, the reference element is electrically connected to other electrodes via an external circuit. The reference element is thus typically provided with a suitable electrical termination for connection to a circuit. For example, in the case of a silver wire reference electrode, the electrical termination may be an uncoated end of the wire.

The reference potential, relative to a sensing electrode, is measured by electrical conduction through the electrically conductive body of the reference element. Because the reference electrode is configured for potentiometric, voltammetric and amperometric electrochemical analyses, the potential of the reference element should be measured without significant impedance between the active redox couple on the reference element and the potential-measuring instrument. Thus, the electrode is generally configured for low impedance measurement of the reference potential, with the overall impedance of the electrode primarily attributable to limitations on ionic conductivity between the reference element and the analyte as opposed to limitations on electrical conductivity through the reference element. In particular, the electrode does not include a resistor coupled to the reference element through which the reference potential is measured. It also follows that the electrode is generally configured to provide a single reference potential for measurement, as opposed to electrodes which determine a reference potential by combining the ion-sensitive potentials established at two different electrode sections separated by resistors.

Composite

The reference element is in ionic communication with a composite. The role of the composite is to provide a substantially stable solution concentration of a reference anion at the reference element when the electrode is contacted with and hydrated by an aqueous analyte, while also allowing sufficient ionic conductivity between the reference element and the analyte. The reference element will be suitably in ionic communication with the composite if in contact with or in proximity to the electrolyte, provided that these criteria are met in use. In some embodiments, the reference element is directly in contact with the composite. In some embodiments, the composite is at least partially located between the electrode surface and the reference element.

The composite comprises a water-permeable polymeric matrix loaded with a solid inorganic salt comprising a reference anion. The composite is thus generally a solid material which lacks an internal liquid electrolyte reservoir. However, it is necessary that the composite is sufficiently permeable to water to allow hydration of the composite in use and provide satisfactory ionic conductivity between the reference element and the analyte. Moreover, the rate of leaching of the inorganic salt into the analyte should preferably be low. For some applications, it will also be preferable that the composite is resistant to degradation in strongly acidic or abrasive analytes.

The composite is preferably dimensionally stable in the intended aqueous analyte for the required lifetime of the device, which may be more than one week, or more than one month. Dimensional stability is an important mechanical requirement for many applications. Thus, in some embodiments the composite does not appreciably swell when immersed in an aqueous analyte as this would lead to leaching of the solid inorganic salt. Any swelling may be less than about 10% of the initial volume.

The composite may define the physical body of the solid state reference electrode. However, in some embodiments, the reference electrode comprises a casing around the composite. The casing may be made of a suitably insulating and durable material for the envisaged application, for example poly(methyl methacrylate). If used, the case will generally include a window to expose the composite to the analyte, either directly or through an intermediate water-permeable layer as will be described hereafter.

The polymeric matrix of the composite is loaded with a solid inorganic salt which comprises a reference anion. The inorganic salt is sufficiently soluble in water so that hydration of the composite will produce a constant saturation solution concentration of the reference anion at the reference element. The solid inorganic salt may be dispersed in the polymeric matrix, typically as a particulate solid. Although the solid inorganic salt is typically dispersed throughout the polymeric matrix, it is not excluded that a non-homogeneous distribution of inorganic salt is present in the composite. In some embodiments, the distribution of the inorganic salt results from the gravimetric settling of the particulate salt in a monomer mixture prior to polymerisation.

A high loading of solid inorganic salt may be beneficial, as it may prolong the lifetime of the reference electrode. In some embodiments, the composite comprises at least 10% by mass of the solid inorganic salt, preferably at least 30% by mass, more preferably at least 50% by mass. However, the loading should not be so high that the physical integrity of the composite is compromised. A suitable loading may be achieved by allowing the inorganic salt, in the form of a particulate solid (i.e. a powder) to gravimetrically settle in the monomer mixture prior to polymerisation.

The solid inorganic salt comprises a reference anion. As used herein, a reference anion is an anion which participates in the desired redox half-reaction at the reference element. For example, Ag/AgCl and Ag/Ag$_2$SO$_4$ reference electrodes require chloride and sulphate reference anions respectively. In use, the reference anion should be provided at a constant solution concentration in the composite to obtain a constant reference potential. This is evident, for example, from the half-cell potential for Ag/AgCl reference electrodes given by the applicable Nernst equation (1):

$$E = E^0 - \frac{RT}{F} \ln a_{Cl^-} \quad (1)$$

in which E is the half-cell reduction potential, $E^0$ is the standard half-cell reduction potential, R is the universal gas constant, T is the temperature and $a_{Cl^-}$ is the activity (correlated to concentration) of the chloride ions.

In some embodiments, the solid inorganic salt is a sulfate salt, for example potassium sulfate for an Ag/Ag$_2$SO$_4$ reference electrode. In other embodiments, the solid inorganic salt is a chloride salt, for example potassium chloride (KCl), sodium chloride (NaCl), or lithium chloride (LiCl), preferably KCl. Chloride reference anions are required where the reference electrode is, for example, an Ag/AgCl or calomel electrode.

In some embodiments, the inorganic salt consists of inorganic cations and inorganic anions, i.e. it lacks coordinating ligands or any other organic components. The inorganic salt is not covalently bonded to the polymeric matrix of the composite, as the polymeric matrix and inorganic salt are chemically distinct components of the composite. By contrast, an ionic polymer charge-balanced with reference ion is not a composite loaded with an inorganic salt and provides, by itself, an insufficient amount of readily soluble reference ion to establish a long-lasting and constant saturation solution concentration at the reference element.

The inorganic salt may be a particulate solid. In some embodiments, the particulate solid has an average particle size of less than 1 mm, preferably less than 500 microns. The particles may be small enough to form a well-dispersed distribution throughout the polymeric matrix.

The composite comprises a water-permeable polymeric matrix loaded with the inorganic salt comprising reference anion, and in some embodiments also the solid ion-exchange material. As used herein, the polymeric matrix is the polymer phase of the composite within which the inorganic salt is loaded. In at least some embodiments, the composite comprises the polymeric matrix as a continuous phase and the inorganic salt as the discontinuous phase. The polymer of the polymeric matrix should thus have a suitable hydrophobic-hydrophilic balance. The water-permeability should be sufficient to allow hydration of the composite and to provide ionic conductivity through the polymeric matrix between the reference element and the analyte. The impedance of the electrode is thus acceptably low and the electrode can achieve stable potential (i.e. become conditioned) in an acceptable time when placed in an analyte. However, it is also preferred that the composite should not be too hydrophilic, as this may result in substantial swelling of the polymer, loss of physical integrity of the electrode body and/or rapid leaching of the inorganic salt and/or the solid ion-exchange material into the analyte. The polymeric matrix is generally electrically insulating, and in particular is not composed of an intrinsically conducting polymer (such as polypyrrole). The reference element and the ion-exchange material are thus electrically isolated from each other in use.

The type of polymer is not considered to be limited provided that the polymeric matrix is suitably water-permeable, having regard to the considerations set out above. The polymer may thus in some embodiments be a vinyl polymer, an epoxy resin, a polyester resin, a polysiloxane, a polyurethane, a polysaccharide. Specific examples of suitable polymers may include propoxylate diglycidyl ether, methyl methacylate glycidyl methacylate-tetrahydrofurfuryl acrylate copolymer, cellulose acetate, ethyl cellulose, cellulose etc as disclosed in WO2012074356A1, silicon rubber, polyvinyl chloride, polystyrene, polyhydroxyethyl-methacrylate, polyvinylidene chloride and polyurethane as disclosed in WO1996035116A1, cellulose acetate, cellulose acetate butyrate, cellulose triacetate, nitrocellulose and their combinations as disclosed in U.S. Pat. No. 6,793,789B2, polymers of vinyl fluoride, hexafluoropropylene, vinylidene fluoride, trifluoroethylene, chlorotrifluoroethylene as disclosed in U.S. Pat. No. 4,908,117A, epichlorohydrin epoxy resins as disclosed in DE102010050481A1, polymethylmethacrylate, polyacrylonitrile, polybutyl acrylate etc as disclosed in U.S. Pat. No. 8,486,246B2, N-acrylamide as disclosed in DE10354100A1, acrylate polymers as disclosed in WO2006032284A1, polymers or copolymers of N-acroloyl amino ethoxy ethanol as disclosed in U.S. Pat. No. 7,790,323B2, and copolymers of a cationic monomer comprising a quaternary amine and an anionic monomer as disclosed in DE10201 1089707A1.

In some embodiments, the polymeric matrix of the composite comprises a vinyl polymer. As used herein, a vinyl polymer is an addition polymer of one or more vinyl monomers, comprising an extended alkane ( . . . —C—C—C—C—C— . . . ) backbone chain. A wide range of vinyl polymers may be suitable, although achieving an optimum hydrophobic-hydrophilic balance for low impedance and high electrochemical stability, while also providing excellent chemical resistance and mechanical stability, may require an appropriate combination of the monomer(s), cross-linking groups and degree of cross-linking in the polymeric matrix, as will be further described hereafter.

The vinyl polymer may be a polymer of at least one vinyl monomer containing a heteroatom, optionally containing more than one heteroatom. The heteroatom or heteroatoms may be selected from oxygen and nitrogen. Such heteroatom-containing vinyl monomers may confer hydrophilicity to the polymer backbone chain, allowing hydration and ionic conductivity through the composite. In some embodiments, the vinyl monomer containing a heteroatom is selected from the group consisting of vinyl esters, vinyl amides, acrylates, acrylonitrile and vinyl ethers. In some embodiments, the vinyl monomer comprises a carbonyl group, and may be selected from the group consisting of vinyl esters, vinyl amides and acrylates. Suitable vinyl monomers may include vinyl acetate, vinyl caprolactam, methyl (meth)acrylate, ethyl (meth)acrylate, butyl (meth)acrylate and hexyl (meth) acrylate.

In some embodiments, the vinyl polymer includes vinyl monomers containing a heteroatom as the only monofunctional monomers. In other embodiments, the vinyl polymer is a copolymer of vinyl monomers containing a heteroatom and less polar vinyl monomers lacking a heteroatom. Suitable monomer compositions for the vinyl polymer may be selected by the skilled person, having regard to the principles disclosed herein, without undue burden.

In some embodiments, the vinyl polymer is a cross-linked vinyl polymer. Such a polymer may be obtained, for example, by co-polymerising a mixture comprising a vinyl monomer containing a heteroatom and a co-polymerisable cross-linking agent. The cross-linking of the vinyl polymer may in some embodiments enhance the resistance of the electrode to degradation as a result of chemical attack, for example under strongly acidic and/or high temperature use conditions. In some embodiments, the cross-linking may enhance the resistance of the electrode to mechanical degradation, for example under abrasive use conditions.

In some embodiments, the vinyl polymer is cross-linked with hydrophilic cross-linking groups. As used herein, hydrophilic cross-linking groups are groups which impart hydrophilic properties to the polymer matrix. Hydrophilic cross-linking groups are generally organic linking groups which contain one or more hydrophilic functionalities, such as carboxyl, ether, amide and amine groups, preferably carboxyl and/or ether groups. In other embodiments, the vinyl polymer is cross-linked with more hydrophobic cross-linking groups. It will be appreciated that, in this case, a more hydrophilic backbone may be desirable to achieve the required overall hydrophilic-hydrophobic balance.

The cross-linked vinyl polymer may be a co-polymer of a vinyl monomer comprising a heteroatom and a cross-linking agent having at least two co-polymerisable vinyl functionalities, such as acrylates or methacrylates. The cross-linking agent may be a hydrophilic cross-linking agent, such as for example ethylene glycol di(meth)acrylate, oligoethylene glycol di(meth)acrylate or polyethylene glycol di(meth)acrylate. In other embodiments, the cross-linking agent may have hydrophobic character, such as the aliphatic cross-linker 1,6-hexanediol di(meth)acrylate.

In some embodiments, the cross-linking agent is selected from the group consisting of ethylene glycol di(meth)acrylate, diethylene glycol di(meth)acrylate, trethylene glycol di(meth)acrylate, tetraethylene glycol di(meth)acrylate, poly (ethylene glycol) dimethacrylate (for example, Mn=330-20, 000), poly(ethylene glycol) diacrylate (for example, Mn=250-20,000), N,N'-methylene bis-acrylamide, 1,3-butanediol di(meth)acrylate, 1,4-butanediol di(meth)acrylate, 1,6-hexanediol di(meth)acrylate, bisphenol A glycerolate di(meth)acrylate, diurethane di(meth)acrylate, divinylbenzene, trimethylolpropane tri(meth)acrylate, pentaerythritol tri(meth)acrylate, glycerol propoxylate triacrylate (for example, Mn=428), trimethylolpropane ethoxylate triacrylate and trimethylolpropane propoxylate triacrylate. As used herein, a "(meth)acrylate" refers to either an acrylate or a methacrylate. In some embodiments, the cross-linking agent is selected from the group consisting of ethylene glycol di(meth)acrylate, poly(ethylene glycol) di(meth)acrylate.

The cross-linked vinyl polymer contains a suitable cross-linking density. If the cross-linking density is too low, the resistance to chemical and or mechanical degradation or the long term stability of the reference electrode may be lower than desirable. However, if the cross-linking density is too high, the permeability or mechanical properties of the polymer may be unsatisfactory. In embodiments where the vinyl polymer is a co-polymer of a vinyl monomer containing a heteroatom and a cross-linking agent, the vinyl polymer may comprise from 0.5 to 7% by mass of the cross-linking agent, such as from 1 to 4% by mass of the cross-linking agent, or from 1.5 to 3.5% by mass of the cross-linking agent.

Solid Ion-Exchange Material

The solid state reference electrode comprises a solid ion-exchange material which comprises one or more non-interfering ions. The material is located between an electrode surface for contacting the analyte and the reference element. In use, the solid ion-exchange material immobilises one or more interfering ions, when present in solution in the analyte, by exchange with the non-interfering ions. The role of the solid ion-exchange materials is thus to sacrificially react by ion exchange with interfering ions infiltrating the electrode, thereby immobilising them and preventing, inhibiting or delaying them from reaching the reference element. The ions released in the ion exchange reaction are non-interfering anions, and thus have little or no deleterious effect on the electrode's potential stability.

As used herein, an interfering ion is capable of participating in competitive redox reactions at the reference element which cause a deviation from the expected electrode potential. By contrast, a non-interfering ion is one which does not significantly affect the measured electrode potential.

In some embodiments, the solid ion-exchange material comprises a non-interfering anion. The ion-exchange material may thus protect the electrode from one or more interfering anions present in the analyte by anion exchange. Without wishing to be bound by any theory, the inventors consider that probable interfering and non-interfering anions may be distinguished for a given electrode system by comparing the standard reduction potential of the relevant redox reactions expected at the reference electrode. Taking the example of an Ag/AgCl reference electrode, the standard reference reduction potentials (at 25° C., 1 atm) for a selection of anions are shown in Table 1. Anions which react at the reference element at a standard reference potential more negative than the reference electrode reaction may be expected to interfere with the measured potential. By contrast, anions involved in reactions with the same or more positive standard reference potential are not expected to interfere with the measured potential.

TABLE 1

| Anion | Reaction | Standard reduction potential, $E^0$ (V) | Type |
| --- | --- | --- | --- |
| Sulphide | $Ag_2S + 2e^- \leftrightarrow 2\,Ag + S^{2-}$ | −0.691 | Interfering |
| Iodide | $AgI + e^- \leftrightarrow Ag + I^-$ | −0.152 | Interfering |
| Cyanide | $AgCN + e^- \leftrightarrow Ag + CN^-$ | −0.017 | Interfering |
| Bromide | $AgBr + e^- \leftrightarrow Ag + Br^-$ | 0.071 | Interfering |
| Chloride | $AgCl + e^- \leftrightarrow Ag + Cl^-$ | 0.222 | Non-interfering (reference anion) |
| Nitrate | $AgNO_3 + e^- \leftrightarrow Ag + NO_3^-$ | 0.564 | Non-interfering |
| Sulfate | $Ag_2SO_4 + 2e^- \leftrightarrow 2\,Ag + SO_4^{2-}$ | 0.654 | Non-interfering |

Anionic species such as sulphide, bromide, iodide and cyanide may thus interfere with reference electrodes which rely on chloride or sulphate as the reference anion. Where sulphate is the reference anion, chloride may also be an interfering anion. Sulphide in particular has been found to be of significant concern for the long-term stability of composite reference electrodes, consistent with the substantial difference between the standard reduction potential of sulphide-involving redox reactions compared to those with chloride or sulphate.

It follows that the range of suitable non-interfering anions which the ion-exchange material may include will depend on the redox couple forming the basis for the reference potential measurement. For Ag/AgCl or saturated calomel reference elements, the solid ion-exchange material may comprise an anion selected from chloride, sulphate or nitrate.

In some embodiments, the solid ion-exchange material comprises the reference anion itself as the exchangeable anion. This is particularly preferred as the resultant ion exchange reaction simply releases additional reference anion into an environment where it is already present in solution. Thus, for Ag/AgCl or saturated calomel reference elements, the solid ion-exchange material preferably comprises exchangeable chloride. For Ag/Ag$_2$SO$_4$ reference elements, the solid ion-exchange material may comprise exchangeable sulphate.

In some embodiments, the solid ion-exchange material comprises a non-interfering cation capable of ion-exchange with one or more interfering cations present in the analyte.

The solid ion-exchange material may generally be any solid material able to immobilise interfering anions and release non-interfering ions by an ion exchange mechanism. In some embodiments, the solid ion-exchange material comprises a metal salt or an ion exchange resin. The solid ion-exchange material may be a particulate material, for example having an average particle size of less than 10 mm, or less than 5 mm, or less than 1 mm, or less than 500 microns. The particulate ion-exchange material may thus be dispersed throughout the polymeric matrix of the composite or a further protective layer between the composite and the electrode surface, such that a good protective effect is provided.

Metal Salts as Solid Ion Exchange Materials

In some embodiments, the solid ion-exchange material is a metal salt. The metal salt need not be completely insoluble in water, but preferably has a lower solubility in water than the solid inorganic salt comprising the reference anion. Thus, it is unlikely to be leached out of the composite during the useful lifetime of the electrode. Moreover, the relative insolubility may assist to immobilise interfering ions in use, since the product salt is also expected to be relatively insoluble.

As discussed above, the invention may be used to protect the electrode from one or more interfering anions, and the metal salt may thus be a metal salt of a suitable non-interfering anion. Most preferably, the metal salt comprises the reference anion itself.

The selection of the metal in the metal salt may depend on the interfering anions expected in the analyte, since the goal is to precipitate the product salt of the ion exchange reaction as an insoluble salt. Moreover, the metal salt should preferably have a strong affinity for the interfering anion, thus providing good selectivity and rapid ion-exchange kinetics in the salt metathesis reaction. For the immobilisation of sulphide anions, salts comprising a wide range of metal cations may be suitable, since most metals other than certain alkali and alkali earth metals form insoluble sulphides. For other interfering anions such as bromide, iodide and chloride, the range of metals which form insoluble salts is narrower, including for example silver, mercury and lead.

In some embodiments, the metal salt comprises a metal present in the reference element, and which participates in the reference redox reaction. Thus, any dissolution of the metal salt inside the electrode will not release metal species involved in competing redox reactions at the reference element. In some embodiments, the metal salt comprises a cation selected from silver and mercury, and an anion selected from chloride and sulphate. In particular, AgCl may be a preferred ion-exchange metal salt for an Ag/AgCl reference element, Ag$_2$SO$_4$ may be a preferred ion-exchange metal salt for an Ag/Ag$_2$SO$_4$ reference element, and Hg$_2$Cl$_2$ may be a preferred ion-exchange metal salt for a saturated calomel reference element.

Ion Exchange Resins as Solid Ion Exchange Materials

In some embodiments, the solid ion-exchange material is an ion-exchange resin. Ion exchange resins are believed to work in a similar way to a metal salt, by an exchange of interferant ion with ions of the exchange resin, consequently immobilising the interferant ion and preventing it from interacting with the reference element.

Ion-exchange resins are polymers, for example cross-linked polystyrene, having ionic functionalities which are charge-balanced by the exchangeable ions. Both cation-exchange and anion-exchange resins are known, and either may be selected depending on whether interception and immobilisation of cationic or anionic interferent ions is desired. In some embodiments, the ion-exchange resin is an anion-exchange resin, for example a strongly or weakly basic ion-exchange resin. Basic ion-exchange resins typically comprise pendant quaternised amine functionalities, with the exchangeable anion charge-balancing the cationic amine groups. The ion-exchange resin included in the electrode may thus initially be loaded with a suitable non-interfering anion, for example chloride. The basic ion-exchange resin may have a lower affinity for the non-interfering anion with which it is initially loaded than the interfering anion(s) present in the analyte, so that immobilisation of the interferant anion(s) on the resin is favoured.

It is preferred to use a resin whose exchange ion matches that of the redox couple in the reference element. In the case of a Ag/AgCl reference, likely candidates include chloride based exchange resins such as Amberjet 4200 Cl, Amberlite IRA410 Cl, Dowex 1X8 chloride form, and Dowex Marathon A chloride form.

Location of the Solid Ion-Exchange Material

At least a portion of the solid ion-exchange material is located between the electrode's analyte-contacting surface and the reference element. As described above, the role of the solid ion-exchange material is to intercept and immobilise the interfering anions as they diffuse into the electrode and thus reduce the probability of undesirable interactions at the reference element. Accordingly, the solid ion-exchange material should be located and dispersed in the electrode in a manner suitable to perform this function.

It will also be apparent to the skilled person that the ion-exchange material actually involved in sacrificial ion-exchange reactions should not be in electrical communication with the reference element, or the reactions will adversely affect the measured reference potential. Thus, at least the sacrificially reacting portion of the solid ion-exchange material is physically separated from the reference element, for example by the insulating polymeric matrix of the composite. The reference element is electrically insulated from at least the sacrificially reacting portion of the solid ion-exchange material.

The solid ion-exchange material may be loaded in a polymeric composite in the electrode. It may be loaded in the polymeric matrix of the same composite in which the solid inorganic salt is also loaded, and/or it may be loaded in a different polymeric composite located between the electrode surface and the reference element, for example a discrete electrode layer. The loading of both the solid ion-exchange material and the solid inorganic salt in polymeric composites in the electrode, for example the same composite, may provide a number of advantages, including simplicity of manufacture, control over the electrode hydration and efficient interception and immobilisation of interfering ions. It may also provide excellent electrode lifetime and reliability, including in abrasive or corrosive analytes, as the solid components may be embedded in, and optionally dispersed throughout, a polymeric matrix (or matrices) which can be tailored for their compatibility with such analytes. This construction also provides the opportunity to renew a used electrode, for example an electrode with surface fouling, by removing a surface layer of the composite electrode, without losing the protective capability of the electrode.

In some embodiments, the solid ion-exchange material is present in the polymeric matrix of the same composite in which the solid inorganic salt is loaded. The solid ion-exchange material and the solid inorganic salt comprising reference anion may thus be co-dispersed in the polymeric matrix, for example as particulate materials. The solid ion-exchange material may be present in an amount of at least 1 wt %, such as at least 3 wt %, of the composite.

In such configurations, the composite may be exposed, for example via a window in an electrode casing, thereby forming the electrode surface for contacting the analyte. In use, the electrode is immersed in the analyte and hydrates due to permeation of water into the composite. Interfering ions diffusing into the composite react via ion-exchange reactions with the solid ion-exchange material, thereby becoming immobilised in the composite before reaching the reference element. The inventors have found by experiment that sulphide anions are immobilised in a thin surface layer of a composite comprising 5 or 10 wt % AgCl dispersed in the matrix, and do not penetrate to a depth where interference with the reference element is possible. The reference element should thus be positioned a sufficient depth beneath the composite surface such that the interfering ions are immobilised before reaching it, while still allowing sufficient ionic conductivity between reference element and analyte. In some embodiments, the reference element is between 1 mm and 10 mm from the surface.

Figure 1:
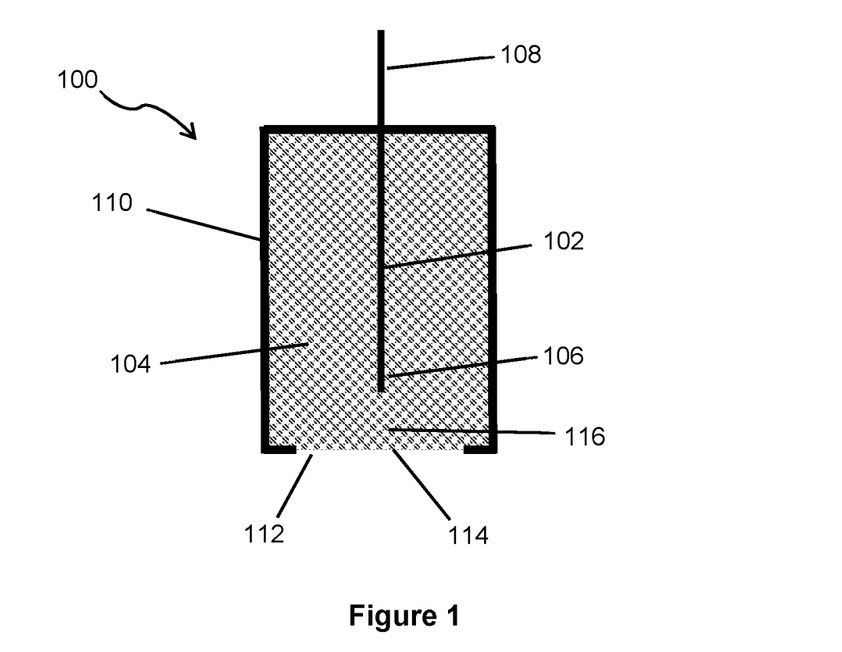
FIG. 1 schematically depicts a solid state reference electrode according to an embodiment of the invention, in which the solid ion-exchange material is dispersed within the composite.

One such embodiment of the invention is depicted in FIG. 1. Electrode 100 comprises reference element 102 which is embedded in composite 104. Reference element 102 comprises a silver wire having proximal end 106 coated with silver chloride and in contact with the composite 104. Distal end 108 extends out of the composite and is thus electrically connectable to a potentiometer. Composite 104 comprises a matrix of polyvinyl acetate cross-linked with about 2 wt % of ethylene glycol dimethacrylate (EGDMA). The matrix is loaded with particulate potassium chloride (KCl), present in an amount of greater than 50 wt % of the composite, and particulate silver chloride (AgCl), present in an amount of about 5 wt % of the composite. The particulate components are dispersed through the composite. Impermeable polymer casing 110 encloses the composite except at window 112, where surface 114 of the composite is exposed for contact with an analyte.

In use, electrode 100 is immersed in an aqueous analyte comprising one or more target species for analysis and one or more interfering anions including sulphide. The composite is hydrated via window 112, dissolving some of the KCl and establishing a saturation concentration of chloride ions at reference element 102. Electrode 100 thus provides a stable Ag/AgCl reference potential against which the potential of an ion-selective or working electrode can be measured, as will be explained in greater detail hereafter.

The interfering anions present in the analyte will infiltrate the composite during initial hydration and, by diffusion, during ongoing use of the reference electrode. However, in accordance with the principles disclosed herein, the interfering anions are immobilised on the particulate AgCl particles located between surface 114 and the reference element 102, for example at location 116. The ion-exchange reaction which is believed to immobilise the sulphide anions is the salt metathesis reaction shown by equation 2:

$$S^{2-}(aq) + 2\,AgCl\,(s) \rightarrow Ag_2S\,(s) + 2\,Cl^-(aq) \qquad (2)$$

The release of chloride anions by the ion-exchange reaction has no effect on the measured reference potential, considering that the interior of composite 104 already has a saturation concentration of chloride and that the reference element is electrically insulated from the AgCl particles which intercept and immobilise the sulphide ions.

Figure 2:
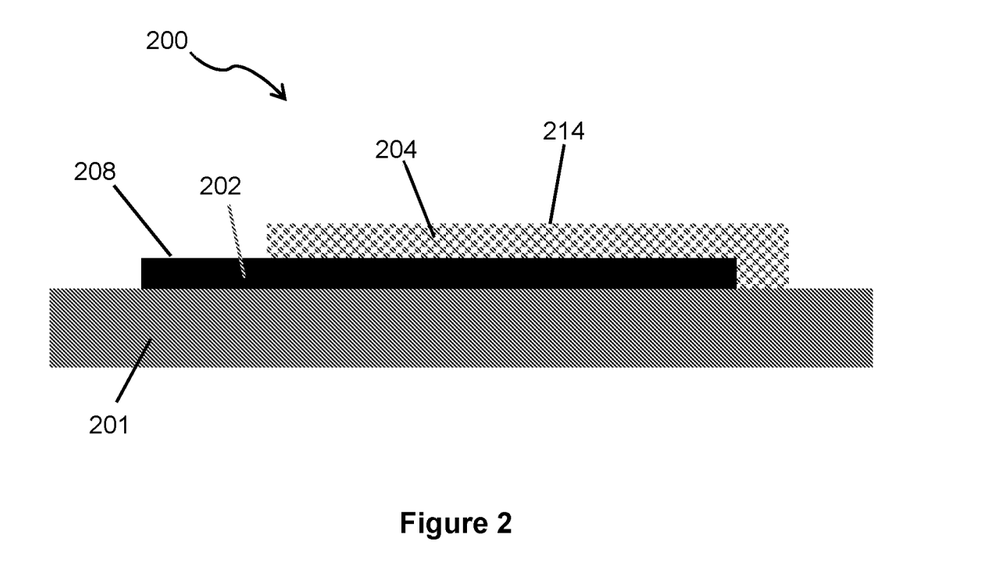
FIG. 2 schematically depicts a printed solid state reference electrode according to another embodiment of the invention, in which the solid ion-exchange material is dispersed within a printed composite layer.

Another embodiment is depicted in FIG. 2. Electrode 200 is a printed electrode, formed on substrate 201 by printing techniques such as screen printing or inkjet printing. Substrate 201 may be any of a wide range of substrates, including a polymeric substrate (e.g. polyethylene terephthalate, polyimide), a paper substrate, a glass substrate, a ceramic substrate or any of these with film coatings, including indium tin oxide. Reference element 202 is a printed layer comprising silver and silver chloride, and may be printed with commercially available Ag/AgCl ink. A layer of composite 204 is printed over the reference element, except at distal end 208 which is left exposed and is thus electrically connectable to a potentiometer. Composite 204 comprises a polymeric matrix, for example polyvinyl acetate (PVAc), with both KCl and AgCl particles dispersed therein. The layer may be printed with an ink comprising PVAc and the particles dispersed in acetone, and cured after printing. Composite 204 may also comprise multiple print layers. Surface 214 of the composite is exposed for contact with an analyte. Optionally, electrode 200 may further comprise an insulating printed layer (not shown) over part of the composite 204, but a portion of the composite surface 214 remains exposed for contact with the analyte. In use, the composite is hydrated through surface 214, thus establishing a reference potential as described herein for electrode 100. However interfering anions such as sulphide are immobilised on AgCl particles in the polymeric matrix by ion-exchange reactions before reaching reference element 202.

In other embodiments, the solid ion-exchange material is present in a water-permeable composite layer located between the electrode surface and the composite loaded with the solid inorganic salt. The water-permeable layer may comprise the solid ion-exchange material dispersed in a hydratable polymer. The water-permeable layer may optionally also contain the solid inorganic salt comprising reference anion, but this is not considered necessary for the functioning of the electrode or to provide a protective effect.

Since hydration of the composite and ionic conductivity between reference element and analyte is provided via the water-permeable layer, it will be apparent that similar considerations regarding the properties of the hydratable polymer apply as to the polymeric matrix of the composite. The hydratable polymer should thus exhibit a hydrophilic-hydrophobic balance suitable to allow rapid conditioning and low impedance, but also to provide dimensional stability and retention of the solid ion-exchange material. Accordingly, while the hydratable polymer may be the same or different from that in the polymeric matrix of the composite, its composition may generally be as described herein for suitable composite polymeric matrices. The water-permeable layer should have a sufficient thickness to allow interception and immobilisation of interfering anions, but not unduly thick as this may increase impedance. In some embodiments, the thickness of the water-permeable layer is between 1 and 5 mm.

In embodiments where the solid ion-exchange material is present in a water-permeable layer, the composite is generally not directly exposed to the analyte. Rather, it is covered by the water-permeable layer, either entirely or at least at locations thereof, such as a window region of an electrode casing, where contact with the analyte would otherwise be expected. An exposed surface of the water-permeable layer may then provide the electrode surface for contacting the analyte. In use, the electrode is immersed in the analyte and hydrates due to permeation of water through the water-permeable layer and into the composite. Interfering ions diffusing through the water-permeable layer react via ion-exchange reactions with the solid ion-exchange material, thereby becoming immobilised in the water-permeable layer before reaching the composite or the reference element.

It is of course not excluded that further water-permeable layers may be present, either between the inorganic salt-loaded composite and the layer comprising solid ion-exchange material, or as an outer layer forming the analyte-contacting surface of the electrode.

Figure 3:
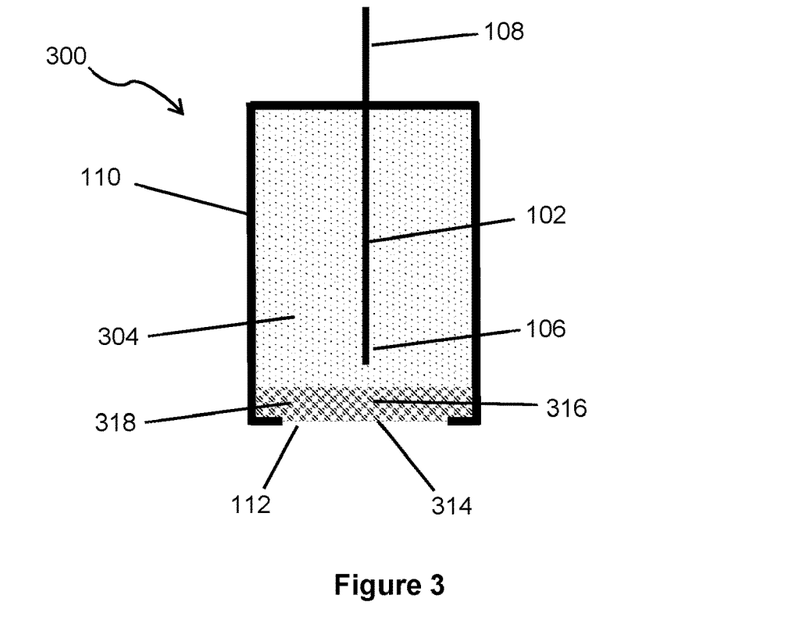
FIG. 3 schematically depicts a solid state reference electrode according to another embodiment of the invention, in which the solid ion-exchange material is present in a water-permeable layer located between the electrode surface and the composite.

An embodiment of the invention is depicted in FIG. 3, in which similarly numbered items are as described herein for electrode 100 depicted in FIG. 1. In electrode 300, reference element 102 is embedded in composite 304, which comprises an EGDMA cross-linked polyvinyl acetate matrix with particulate KCl dispersed therein. However, the particulate ion-exchange material is not present in the composite but is instead present in water-permeable layer 318 arranged directly against composite 304. Layer 318 comprises an EGDMA cross-linked polyvinyl acetate matrix with the particulate AgCl dispersed therein, and has a thickness of about 1-5 mm. Surface 314 of the water-permeable layer is exposed for contact with an analyte in window 112 of casing 110.

In use, electrode 300 is immersed in an aqueous analyte comprising one or more target species for analysis and one or more interfering anions including sulphide. The water-permeable layer and the composite is hydrated via window 112, dissolving some of the KCl and establishing a saturation concentration of chloride ions at reference element 108. Electrode 100 thus provides a stable Ag/AgCl reference potential. The interfering anions present in the analyte will infiltrate the water-permeable layer during initial hydration and, by diffusion, during ongoing use of the reference electrode. However, in accordance with the principles disclosed herein, the interfering anions are immobilised on the particulate AgCl particles located in the water-permeable layer, for example at location 316 between surface 314 and reference element 102.

Methods of Producing the Solid State Reference Electrode

It will be apparent from the above discussion that a number of different electrode configurations fall within the scope of the invention. Accordingly, the method of producing the solid state reference electrode will also vary.

The methods generally comprise producing a composite comprising a water-permeable polymeric matrix loaded with a solid inorganic salt comprising a reference anion. In some embodiments, the solid ion-exchange material is also dispersed in the polymeric matrix. The solid inorganic salt and solid ion-exchange material have already been described herein.

In some embodiments, the solid inorganic salt and optionally also the solid ion-exchange material are combined with a polymer precursor, such as a polymerizable composition comprising one or more monomers, a cross-linkable polymer or a curable resin. The polymer precursor is then polymerised, cross-linked and/or cured to form the water-permeable polymeric matrix loaded with the inorganic salt and optionally the solid ion-exchange material.

Where the water-permeable polymeric matrix comprises a vinyl polymer, the method may comprise combining the solid inorganic salt and optionally the solid ion-exchange material with a polymerizable composition comprising one or more vinyl monomers. The polymerizable composition may optionally include a cross-linking agent comprising at least two co-polymerisable vinyl functionalities. Suitable vinyl monomers and cross-linking agents have already been described herein. The composite is then produced by polymerising the composition, typically in the presence of a free radical initiator or catalyst. The polymerizable composition may thus comprise a photoinitiator, such as 2,2-dimethoxy-2-phenylacetophenone. The method may then comprise irradiating the mixture with UV light for a time sufficient to initiate and satisfactorily complete the polymerisation. Alternatively, the mixture may comprise a thermally-activated initiator, such as 2,2'-azobis(2-methylpropionitrile). The method may then comprise heating the mixture to a temperature and for a time sufficient to initiate and satisfactorily complete the polymerisation. It is also envisaged that a composite with cross-linked polymeric matrix may be produced by combining the solid inorganic salt and optionally the solid ion-exchange material with an uncross-linked vinyl polymer and subsequently cross-linking the polymer.

The composite is produced to be in ionic communication with the reference element. Suitable reference elements have also been described already. In some embodiments, the reference element is therefore contacted with the polymer precursor containing the inorganic salt, and optionally the solid ion-exchange material, prior to the completion of polymerisation, cross-linking or curing. For example, the reference element may be inserted into the polymer precursor, or the polymer precursor may be cast or printed onto the reference element. Polymerisation or curing may then be initiated to produce the electrode with the reference element contacting or adhered to the composite.

In embodiments where the solid ion-exchange material is dispersed in the composite, the method may comprise providing a surface of the composite as the electrode surface for contacting the analyte in use. If, for example, the polymer precursor is polymerised or cured in a casing, a window of a suitable size may subsequently be created in the casing to expose the surface of the composite.

In embodiments where the solid ion-exchange material is present in a water-permeable layer of polymeric composite located between the electrode surface and the composite loaded with solid inorganic salt comprising reference ion, the method of the invention may comprise providing this water-permeable layer. The water-permeable layer may be provided such that it comprises the solid ion-exchange material, and optionally also the solid inorganic salt comprising the reference anion, dispersed in a hydratable polymer. The hydratable polymer has already been described herein. Accordingly, it may be produced in similar manner to the polymeric matrix of the composite, for example by dispersing the solid-ion exchange material in a polymer precursor and polymerising, cross-linking or curing the precursor to form the water-permeable layer having the necessary properties.

The water-permeable layer may be formed against the composite. This may either involve forming the composite on the water-permeable layer or forming the water-permeable layer on the composite. For an example of the first alternative, electrode 300 depicted in FIG. 3 may be produced by placing a mixture of vinyl acetate, EGDMA, particulate AgCl and a free radical initiator in a layer at the bottom of casing 110 (before window 112 is opened). The mixture is then polymerised to form water-permeable layer 318 comprising cross-linked polyvinyl acetate with dispersed AgCl. A mixture of vinyl acetate, EGDMA, particulate KCl and a free radical initiator is then transferred into the casing and reference element 102 is inserted to the required depth in the mixture. The mixture is then polymerised to form composite 304 on top of the water-permeable layer. Finally, window 112 is created in the casing to expose surface 314.

In an example of the second alternative, a printed electrode may be produced on a substrate by consecutively printing and curing i) a conductive reference element layer comprising Ag and AgCl, ii) a composite layer comprising KCl dispersed in a water-permeable polymeric matrix, on a portion of the reference element, and ii) a water-permeable layer comprising AgCl dispersed in a hydratable polymer, covering the composite layer.

In embodiments where the solid ion-exchange material is dispersed in the water-permeable layer, the method may comprise providing a surface of the water-permeable layer as the electrode surface for contacting the analyte in use. If, for example, the electrode if prepared in a casing, a window of a suitable size may be created in the casing to expose the surface of the water-permeable layer.

System and Method for Electrochemical Analysis of an Analyte

The solid state reference electrodes of the invention may be used in electrochemical analyses, including potentiometric, voltammetric and amperometric measurements. In potentiometric analyses, the difference in electric potential between an ion-sensitive electrode and a reference electrode in contact with an analyte is passively measured. In three-electrode voltammetric analyses, a working electrode and a counter electrode are contacted with an analyte, the potential between these electrodes is varied according to a predetermined pattern, and the resulting current transfer to the analyte is measured. The reference electrode is coupled to the working electrode and thus allows the working potential to be measured and controlled in the analysis. A similar arrangement is used in amperometric analyses, except that the current flow is controlled and the resultant potential difference between the working electrode and reference electrode is measured.

Accordingly, the invention relates to a system for electrochemical analysis of an analyte. The system comprises a solid state reference electrode as described herein, an ion-selective or working electrode (depending on the type of analysis to be performed), and means for measuring the difference in electric potential between the ion-selective electrode or working electrode and the reference electrode, such as a voltmeter or potentiostat.

In some embodiments, the system is a potentiometric analysis system for determining an ionic concentration in an analyte. The system comprises a solid state reference electrode as described herein, an ion-selective electrode, and means for measuring the difference in electric potential between the ion-selective electrode and the reference electrode, such as a voltmeter or potentiostat.

The invention also relates to a method of electrochemical analysis of an analyte. The method comprises contacting a solid state reference electrode as described herein and an ion-selective electrode or an counter electrode with an analyte, and measuring the difference in electrochemical potential between the reference electrode and the ion-selective electrode or working electrode. The two electrodes may be contacted with the analyte by immersion therein. The analyte may be an aqueous analyte. The difference in electrochemical potential may be measured with a voltmeter or potentiostat.

In some embodiments, the method is a method of determining an ionic concentration in an analyte. The method comprises contacting a solid state reference electrode as described herein and an ion-selective electrode with an analyte, and measuring the difference in electrochemical potential between the ion-selective electrode and the reference electrode.

In the systems and methods for determining an ionic concentration, the ion-selective electrode is not considered particularly limited and will depend on the target application. For example, the ion selective electrode may be a potentiometric sensor for pH, oxidation reduction potential (ORP), cyanide, metal ions or a biological sensor. In some embodiments, the ion-selective electrode is sensitive to hydrogen-ions, such that the system is a pH meter. In some embodiments, the ion-selective electrode is a solid-state electrode, for example a polymer composite electrode. An example of such an electrode is a composite hydrogen-ion selective sensor comprising a mixture of $Ta_2O_5$ and $RuO_2$ dispersed in a polymeric matrix, as described in WO2016/033632.

Interfering ions are expected in analytes subject to electrochemical analyses in many applications, including environmental monitoring, process monitoring in the mining and chemical industry, oil- and gas-related monitoring systems, biological systems, wastewater treatment and pipelines.

In some embodiments, the analyte is an acidic and/or abrasive analyte in which interfering ions present an added challenge for maintaining a stable reference potential. Examples of such analytes are found in the mining and minerals processing industries. In some embodiments, the analyte is a leachate and leach slurry, for example from a heap leaching operation, or an acid mine drainage stream.

In some embodiments, the analyte comprises one or more interfering ions. The interfering ions may be interfering anions, for example sulphide, iodide, bromide and cyanide. In some embodiments, the analyte comprises sulphide.

EXAMPLES

The present invention is described with reference to the following examples. It is to be understood that the examples are illustrative of and not limiting to the invention described herein.

Materials

All starting materials were purchased from Sigma Aldrich or other commercial suppliers. The KCl used was analytical quality (VWR AnalaR), to avoid shifts of the reference potential due to any inorganic contaminants. Monomers, cross-linking agents and initiators used were 98% purity or higher. Silver particles (99.9%, 5-8 micron) and silver chloride coarse powder (99.997%) were purchased from Alfa Aesar. Amberjet™ 4200 Cl, a strong base (type 1) ion exchange resin in chloride form, with a particle size of 600-800 μm, was commercially procured.

Example 1. Preparation of Electrodes

Silver wires (1.5 mm thick, 99.95% Ag) were polished with fine sandpaper and washed with ethanol. Each wire was inserted into a 1 M KCl solution and connected to a potentiostat. The wires were coated with silver chloride coating by passing a small current (7 mA for 100 seconds) between the silver electrode (anode) and a platinum counter electrode (cathode).

A mixture of vinyl acetate and ethylene glycol dimethacrylate (EGDMA) was prepared, with the EGDMA present as 2 wt % of the total monomer. A small amount of 2,2'-azobis(2-methylpropionitrile) (≤2 mass %) was added to the mixture as a thermal initiator.

Dried KCl powder was added to each mixture, and the settled slurries were transferred by pipette into glass vials (1-10 mL volume) such that the vials were full of KCl powder with the monomer mixture filling the interparticle voids. Solid particulate additive (either AgCl, Ag metal particles or Amberjet™ 4200 Cl ion-exchange resin) was dispersed in some of the mixtures as shown in Table 1. A small amount (0.1-0.5 mL) of additional monomer mixture was transferred into the vial to form a salt-free sealing layer at the top of the vial during the subsequent polymerisation. The mass ratio of KCl to monomer was approximately 2:1 in the mixture.

A silver chloride coated silver wire (2-5 cm length, depending on the vial size) was then inserted into each vial and the vials were sealed. The monomers were co-polymerised by heating the mixture to about 50° C. for about 18 hours. After completion of polymerisation, the bottom portions of the vials were removed by grinding to expose the solid composites comprising a matrix of EGDMA cross-linked polyvinyl acetate (PVAc) loaded with both solid KCl and the solid particulate additive. The electrodes were then ready for use.

TABLE 1

| Electrode number | Particulate additive | Percentage additive in composite (wt. %) |
|---|---|---|
| E1 | None | None |
| E2 | AgCl | 5 |
| E3 | AgCl | 10 |
| E4 | Ag | 5 |
| E5 | Ag | 10 |
| E6 | Amberjet ™ 4200 Cl | 5 |

Example 2. Electrochemical Testing of Electrodes with Metal Salt Additives

The electrochemical performance of electrodes E1-E5, prepared in Example 1 (1.5 mL vial volume), was evaluated in a 1 g/litre $Na_2S$ solution in pH 9 buffer. The potential response of the electrodes was measured against a saturated calomel electrode (SCE) obtained from Koslow Scientific Company (which was regularly maintained during the electrochemical tests to ensure stable performance). A multichannel potentiostat (Biologic VMP3 potentiostat) was used to record the open circuit potential (OCP) signals of the electrodes.

Figure 4:
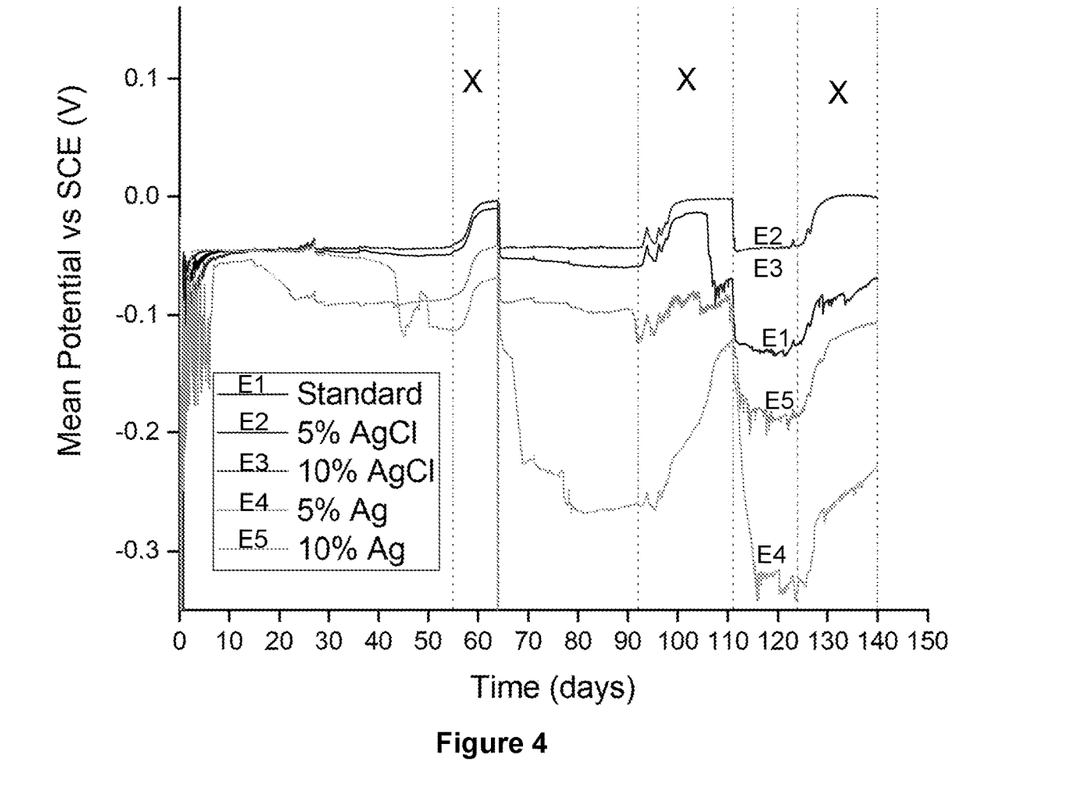
FIG. 4 is a plot of the potential response of electrodes, including electrodes comprising AgCl as the solid ion-exchange material and comparative electrodes lacking a solid ion-exchange material, when exposed to an analyte comprising sulphide anions for 140 days, as measured in Example 2.

FIG. 4 depicts the potential response for the electrodes. The control electrode E1 was initially stable relative to the SCE potential but started to drift after about 30 days exposure to the analyte. After 120 days on line, the potential was −132 mV vs SCE, compared to a theoretical potential of −45 mV vs SCE. Periods indicated by an "X" in FIG. 4 corresponded to time periods where maintenance of the SCE failed.

By contrast, the inclusion of 5 wt % (E2) or 10 wt % (E3) of AgCl particles dispersed through the composite resulted in stable reference potential throughout the experiment, despite the presence of sulphide anions in the analyte. After 120 days on line, the potential was −44 mV vs SCE, compared to a theoretical potential of −45 mV vs SCE. The potentials were virtually identical for electrodes E2 and E3 throughout the experiment. After the experiment, a discoloured layer was observed at the composite interface with the analyte; but no discolouration was apparent deeper in the composite.

It is believed that the protection of the electrode potential is due to immobilisation of the sulphide anions in this layer, thus preventing them from diffusing through the composite to reach the Ag/AgCl wire. The sulphide anions exchange with chloride anions on the AgCl particles, forming insoluble Ag$_2$S and releasing free chloride anions.

The inclusion of Ag metal particles at 5 wt % (E4) or 10 wt % (E5) was not effective in protecting the electrodes from drift caused by sulphide anion interference. For electrode E4, with 5 wt % Ag metal particles, the potential was stable for the first 20 days but severe drift was then observed.

Example 3. Electrochemical Testing of Electrodes with Ion-Exchange Resin Additives The electrochemical performance of electrodes E1 and E6, prepared in Example 1 (1.5 mL vial volume), was evaluated in triplicate in a 1 g/litre Na$_2$S solution in pH 9 buffer. The potential response of the electrodes was measured against a saturated calomel electrode (SCE) obtained from Koslow Scientific Company (which was regularly maintained during the electrochemical tests to ensure stable performance). A multi-channel potentiostat (Biologic VMP3 potentiostat) was used to record the open circuit potential (OCP) signals of the electrodes.

Figure 5:
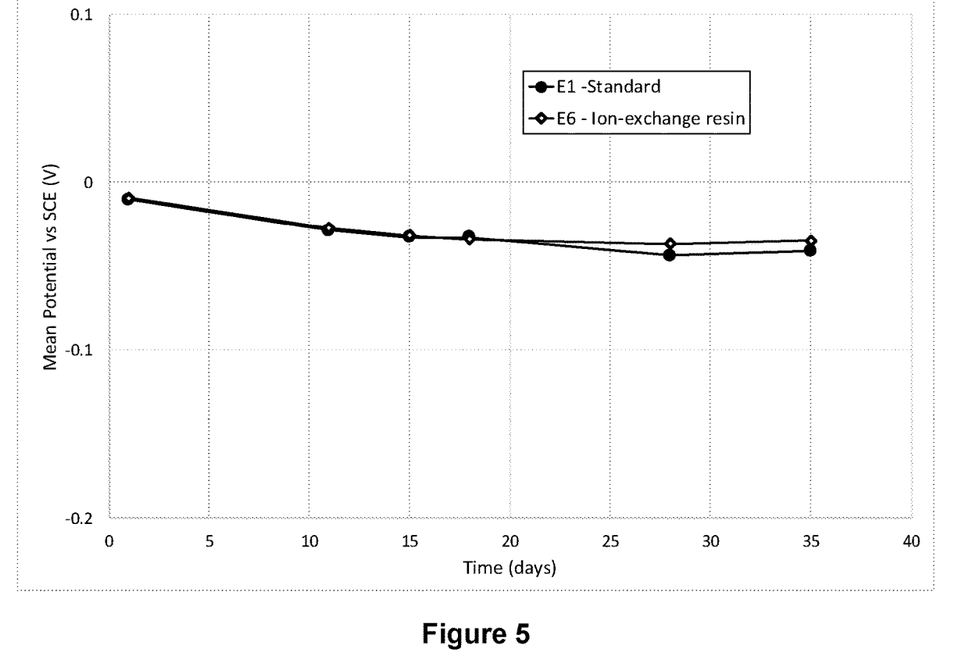
FIG. 5 is a plot of the potential response of electrodes, including electrodes comprising chloride-loaded ion-exchange resin particles as the solid ion-exchange material and comparative electrodes lacking a solid ion-exchange material, when exposed to an analyte comprising sulphide anions, as measured in Example 3.

FIG. 5 depicts the potential response for the electrodes, where the displayed potential is the average of the three electrodes. Control electrodes E1, without any additive, and electrodes E6, with ion-exchange resin additive, provided very similar results initially, levelling out close to the theoretical potential of −45 mV vs SCE. By about 30 days, there were indications that the standard electrode E1 was drifting due to interference from the sulfide, as also seen at about this time in Example 2. By contrast, electrode E6 which contained the chloride-loaded ion-exchange resin continued to display a highly stable potential.

One E1 and one E6 electrode were removed after 24 days on-line, the casings were removed and the electrodes were longitudinally cross-sectioned with a razor blade. Visual inspection of the electrode interior confirmed that the ion exchange resin beads were distributed through the composite. The electrode was then subjected to XRF analysis. Elemental maps (20 mm×10 mm) of the dried cross sections were collected in air at 20 mbar using a Bruker M4 Tornado high performance μXRF spectrometer fitted with a Rh x-ray tube, poly-capillary optics and a Silicon Drift Detector. The poly-capillary optics allowed maps with a spot size diameter of 25 μm to be collected for Mo K$_\alpha$. The mappings were performed with a pixel spacing of 25 μm with an acquisition time of 20 ms pixel$^{-1}$. The X-ray generator was operated at 50 kV and 599 pA using a 12.5 μM Al filter. It was evident from the XRF imaging that sulfur selectively accumulated on the resin beads dispersed in the composite of the E6 electrode. By contrast, no sulfur accumulation was visible in the D1 electrode composite.

Example 4. Accelerated Poisoning Tests

Electrodes E1 (no additives) and E2 (5 wt % AgCl additive) were placed in an aqueous solution of 1 mmol/litre sodium sulphide (Na$_2$S) and 1 mmol/litre sodium bromide (NaBr) buffered at pH 9, and maintained at a pressure of above 8 bar for 7 weeks. The electrodes were then longitudinally cross-sectioned and analysed by XRF by the same method used in Example 3. The elemental mapping results suggested that there was less sulphur and bromine ingress into the interior of the E1 electrode than the E2 electrode.

Example 5. Electrochemical Testing of Electrodes with Metal Salt Additives Under Highly Acidic Conditions The electrochemical performance of electrodes E1 (no additives) and E2 (5 wt % AgCl additive), as prepared in Example 1, was evaluated in a 1000 ppm Na$_2$S aqueous solution acidified to pH 2.6. Five identical electrodes of each type were tested in parallel. The potential response of the electrodes was measured against a commercial Ag/AgCl reference electrode with 3 mol/litre KCl internal electrolyte (which was regularly maintained during the electrochemical tests to ensure stable performance).

Figure 6:
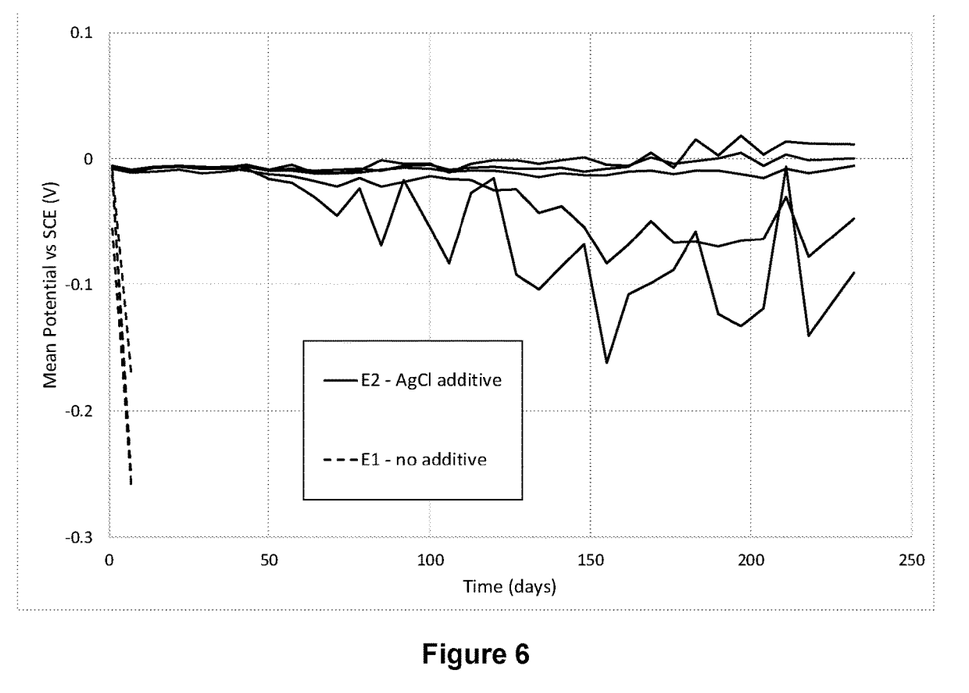
FIG. 6 is a plot of the potential response of electrodes, including electrodes comprising AgCl as the solid ion-exchange material as the solid ion-exchange material and comparative electrodes lacking a solid ion-exchange material, when exposed to a highly acidic analyte comprising sulphide anions, as measured in Example 5.

FIG. 6 depicts the potential response for the electrodes. Three of the control electrodes E1 provided an initial response close to the theoretical potential difference of −9 mV, but all failed by 7 days on-line. By contrast, the five AgCl-containing electrodes E2 were all stable for close to 50 days. After that time, their performance diverged, with two drifting significantly but three continuing to provide a reliable reference potential for in excess of 200 days on-line.

Those skilled in the art will appreciate that the invention described herein is susceptible to variations and modifications other than those specifically described. It is understood that the invention includes all such variations and modifications which fall within the spirit and scope of the present invention.

The invention claimed is:

1. A solid state reference electrode comprising:
   a reference element in ionic communication with a composite, the composite comprising an electrically insulating water-permeable polymeric matrix loaded with a solid inorganic salt comprising a reference anion, wherein the solid inorganic salt is sufficiently soluble in water that hydration of the composite will produce a constant saturation solution concentration of the reference anion at the reference element, and wherein the reference anion is capable of participating in a desired redox half-reaction at the reference element to provide a reference potential;
   an electrode surface for contacting an analyte; and
   a solid ion-exchange material located between the electrode surface and the reference element, the solid ion-exchange material comprising one or more non-interfering ions,
   wherein the reference element is electrically insulated from at least a portion of the solid ion-exchange material, and
   wherein the solid ion-exchange material comprises an ion exchange resin or a metal salt, and is configured to immobilize one or more interfering ions, when present in solution of the analyte, by exchange with the one or more non-interfering ions.

2. The solid state reference electrode according to claim 1, wherein the solid ion-exchange material comprises the ion exchange resin.

3. The solid state reference electrode according to claim 1, wherein the solid ion-exchange material comprises the metal salt having lower water solubility than the solid inorganic salt.

4. The solid state reference electrode according to claim 1, wherein the one or more non-interfering ions are non-interfering anions and the one or more interfering ions are interfering anions.

5. The solid state reference electrode according to claim 4, wherein the non-interfering anions comprise the reference anion.

6. The solid state reference electrode according to claim 4, wherein the solid ion-exchange material comprises the metal salt comprising cations selected from the group consisting of silver, mercury and lead.

7. The solid state reference electrode according to claim 4, wherein the solid ion-exchange material comprises the metal salt comprising a metal present in the reference element.

8. The solid state reference electrode according to claim 4, wherein the solid ion-exchange material is configured to immobilize one or more of the interfering anions selected from the group consisting of sulphide, iodide, bromide and cyanide, when present in the solution of the analyte, by exchange with the non-interfering anions.

9. The solid state reference electrode according to claim 1, wherein the solid ion-exchange material is a particulate material.

10. The solid state reference electrode according to claim 1, wherein the solid ion-exchange material is loaded in the polymeric matrix of the composite or is loaded in a further polymeric composite located between the electrode surface and the reference element.

11. The solid state reference electrode according to claim 1, wherein the reference anion is chloride and wherein the reference element is selected from the group consisting of Ag/AgCl and calomel.

12. The solid state reference electrode according to claim 1, wherein the water-permeable polymeric matrix comprises a vinyl polymer of a vinyl monomer containing a heteroatom.

13. The solid state reference electrode according to claim 12, wherein the vinyl polymer is cross-linked.

14. The solid state reference electrode according to claim 1, wherein the solid inorganic salt is a particulate solid dispersed in the polymeric matrix and wherein the composite comprises at least 30% by mass of the solid inorganic salt.

15. A system for electrochemical analysis of an analyte, the system comprising:
   the solid state reference electrode according to claim 1;
   a second electrode selected from an ion-selective electrode and a working electrode; and
   means for measuring a difference in electric potential between the second electrode and the reference electrode.

16. A method of electrochemical analysis of an analyte, the method comprising:
   contacting i) the solid state reference electrode according to claim 1 and ii) a second electrode selected from an ion-selective electrode and a working electrode with the analyte; and
   measuring a difference in electrochemical potential between the second electrode and the reference electrode.

17. A method according to claim 16, wherein the analyte comprises the one or more interfering ions in the solution of the analyte.

18. A method according to claim 17, wherein the one or more interfering ions are interfering anions.

19. A method according to claim 18, wherein the interfering anions are selected from the group consisting of sulphide, iodide, bromide and cyanide.

* * * * *